United States Patent
Cheng et al.

(10) Patent No.: US 9,538,177 B2
(45) Date of Patent: Jan. 3, 2017

(54) APPARATUS AND METHOD FOR BUFFERING CONTEXT ARRAYS REFERENCED FOR PERFORMING ENTROPY DECODING UPON MULTI-TILE ENCODED PICTURE AND RELATED ENTROPY DECODER

(75) Inventors: Chia-Yun Cheng, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 142 days.

(21) Appl. No.: 14/343,388

(22) PCT Filed: Sep. 12, 2012

(86) PCT No.: PCT/CN2012/081288
§ 371 (c)(1),
(2), (4) Date: Mar. 7, 2014

(87) PCT Pub. No.: WO2013/063982
PCT Pub. Date: May 10, 2013

(65) Prior Publication Data
US 2014/0226728 A1    Aug. 14, 2014

Related U.S. Application Data

(60) Provisional application No. 61/566,984, filed on Dec. 5, 2011, provisional application No. 61/553,350, filed on Oct. 31, 2011.

(51) Int. Cl.
*H04N 19/00* (2014.01)
*H04N 19/174* (2014.01)
(Continued)

(52) U.S. Cl.
CPC ...... *H04N 19/00484* (2013.01); *H04N 19/174* (2014.11); *H04N 19/423* (2014.11); *H04N 19/91* (2014.11); *H04N 19/44* (2014.11)

(58) Field of Classification Search
None
See application file for complete search history.

(56) References Cited

U.S. PATENT DOCUMENTS

| 5,504,823 A | 4/1996 | Yoon |
| 5,802,052 A | 9/1998 | Venkataraman |

(Continued)

FOREIGN PATENT DOCUMENTS

| CN | 1798236 A | 7/2006 |
| CN | 1881445 A | 12/2006 |

(Continued)

OTHER PUBLICATIONS

Chia-Yun Cheng et al., Title: Method and Apparatus for Accessing Data of Multi-Tile Encoded Picture Stored in Buffering Apparatus, pending U.S. Appl. No. 14/616,753, filed Feb. 9, 2015.

(Continued)

*Primary Examiner* — Reza Aghevli
(74) *Attorney, Agent, or Firm* — Winston Hsu; Scott Margo

(57) ABSTRACT

A buffering apparatus for buffering context arrays of a multi-tile encoded picture having a plurality of tiles includes a first buffer and a second buffer. The first buffer is arranged to buffer a first context array referenced for performing entropy decoding upon a first tile of the multi-tile encoded picture. The second buffer is arranged to buffer a second context array referenced for performing entropy decoding upon a second tile of the multi-tile encoded picture. When the first tile is currently decoded according to the first context array buffered in the first buffer, the second context array is buffered in the second buffer.

19 Claims, 11 Drawing Sheets

(51) Int. Cl.
*H04N 19/423* (2014.01)
*H04N 19/44* (2014.01)
*H04N 19/91* (2014.01)

(56) References Cited

U.S. PATENT DOCUMENTS

| | | | |
|---|---|---|---|
| 6,320,909 B1 | 11/2001 | Takabatake | |
| 6,538,583 B1* | 3/2003 | Hallmark | H03M 7/4006 341/51 |
| 6,625,740 B1 | 9/2003 | Datar | |
| 6,741,256 B2 | 5/2004 | Emberling | |
| 7,298,297 B1 | 11/2007 | Li | |
| 7,583,851 B2 | 9/2009 | Kudo | |
| 7,746,401 B2 | 6/2010 | Wu | |
| 7,813,431 B2 | 10/2010 | MacInnis | |
| 8,300,699 B2 | 10/2012 | Stivers | |
| 2002/0085424 A1 | 7/2002 | Trivedi | |
| 2003/0112758 A1 | 6/2003 | Pang | |
| 2003/0126226 A1 | 7/2003 | Ramey | |
| 2003/0155944 A1 | 8/2003 | Verdoorn | |
| 2004/0066852 A1 | 4/2004 | MacInnis | |
| 2004/0143380 A1 | 7/2004 | Stam | |
| 2004/0189623 A1 | 9/2004 | Dunn | |
| 2005/0053290 A1 | 3/2005 | Wada | |
| 2005/0175250 A1 | 8/2005 | Watanabe | |
| 2005/0276325 A1 | 12/2005 | Sato | |
| 2006/0140498 A1 | 6/2006 | Kudo | |
| 2007/0070830 A1 | 3/2007 | Weng | |
| 2007/0088829 A1 | 4/2007 | Shima | |
| 2007/0133674 A1 | 6/2007 | Garnier | |
| 2008/0049240 A1 | 2/2008 | Yamamoto | |
| 2008/0240234 A1 | 10/2008 | Hung | |
| 2009/0002379 A1* | 1/2009 | Baeza | G06T 1/20 345/522 |
| 2009/0003446 A1* | 1/2009 | Wu | H04N 19/176 375/240.16 |
| 2009/0003447 A1* | 1/2009 | Christoffersen | H04N 19/61 375/240.16 |
| 2009/0217004 A1 | 8/2009 | Van De Waerdt | |
| 2009/0224950 A1* | 9/2009 | Xu | H03M 7/4006 341/51 |
| 2010/0021142 A1 | 1/2010 | Minami | |
| 2010/0061455 A1 | 3/2010 | Xu | |
| 2010/0061461 A1 | 3/2010 | Bankoski | |
| 2010/0061645 A1 | 3/2010 | Wilkins | |
| 2010/0134330 A1* | 6/2010 | Sakaguchi | H03M 7/4006 341/51 |
| 2010/0226441 A1 | 9/2010 | Tung | |
| 2010/0265260 A1 | 10/2010 | Swic | |
| 2010/0284456 A1* | 11/2010 | Frank | H04N 19/13 375/240.02 |
| 2011/0164685 A1 | 7/2011 | Zhang | |
| 2011/0216834 A1 | 9/2011 | Zhou | |
| 2012/0294366 A1 | 11/2012 | Eliyahu | |
| 2013/0328896 A1 | 12/2013 | Belanger | |

FOREIGN PATENT DOCUMENTS

| | | |
|---|---|---|
| CN | 1984329 A | 6/2007 |
| CN | 101057224 A | 10/2007 |
| CN | 101087410 A | 12/2007 |
| CN | 101137052 A | 3/2008 |
| CN | 101448061 A | 6/2009 |
| CN | 101543082 A | 9/2009 |
| EP | 1 478 186 A2 | 11/2004 |
| TW | 200913723 | 3/2009 |
| TW | 200931983 | 7/2009 |

OTHER PUBLICATIONS

Marpe et al., "Context-Based Adaptive Binary Arithmetic Coding in the H.264/AVC Video Compression Standard", IEEE Transactions on Circuits and Systems for Video Technology, Jul. 2003, vol. 13, No. 7, p. 620-636.

"International Search Report" mailed on Dec. 20, 2012 for International application No. PCT/CN2012/081288, International filing date:Sep. 12, 2012.

Peter Pirsch et al, VLSI Implementations of Image and Video Multimedia Processing Systems, IEEE Transactions on Circuits and Systems for Video Technology, Nov. 1, 1998, pp. 878-891, XP011014520, vol. 8. No. 7, IEEE, NJ, US.

Jim Bankoski et al, Technical Overview of VP8, an Open Source Video Codec for the Web, Jul. 11, 2011, XP031964900, IEEE, CA, USA.

"International Search Report" mailed on Feb. 28, 2013 for International application No. PCT/CN2012/085145, International filing date:Nov. 23, 2012.

Stephan Wenger et al., "FMO 101", Joint Video Team (JVT) of ISO/IEC MPEG & ITU-T VCEG (ISO/IEC JTC1/SC29/WG11 and ITU-T SG16 Q.6), 4th Meeting: Klagenfurt, Austria, Jul. 22-26, 2002, pp. 1-11, JVT-D063, XP030005337.

Olivier Cantineau et al., "Architecture of a Memory Manager for an MPEG-2 Video Decoding Circuit", 1998, pp. 251-265, Journal of VLSI Signal Processing 20, 1998 Kluwer Academic Publishers. Manufactured in the Netherlands, XP000788432.

Gordon Clare et al., "Picture Raster Scan Decoding in the presence of multiple tiles", Joint Collaborative Team on Video Coding (JCT-VC) of ITU-T SG16 WP3 and ISO/IEC JTC 1/SC 29/WG 11 9th Meeting: Geneva, CH, Apr. 27-May 7, 2012, pp. 1-5, Document: JCTVC-I0158, XP030111921.

Chih-Wei Hsu et al., "AHG4: Low latency CABAC initialization for dependent tiles", Joint Collaborative Team on Video Coding (JCT-VC) of ITU-T SG16 WP3 and ISO/IEC JTC1/SC29/WG11 7th Meeting: Geneva, CH, Nov. 21-30, 2011, pp. 1-8, Document: JCTVC-G197, XP030110181.

Kiran Misra et al., "Tiles", Joint Collaborative Team on Video Coding (JCT-VC) of ITU-T SG16 WP3 and ISO/IEC JTC1/SC29/WG11 5th Meeting: Geneva, CH, Mar. 16-23, 2011, pp. 1-4, Document: JCTVC-E412, XP030008918.

Gordon Clare et al., "Wavefront Parallel Processing for HEVC Encoding and Decoding", Joint Collaborative Team on Video Coding (JCT-VC) of ITU-T SG16 WP3 and ISO/IEC JTC1/SC29/WG11 6th Meeting: Torino, IT, Jul. 14-22, 2011, pp. 1-16, Document: JCTVC-F274, XP030009297.

Jason Garrett-Glaser, Diary of an x264 Developer, The first in-depth technical analysis of VP8, May 19, 2010, XP055133960, URL:http://x264dev.multimedia.cx/archives/377.

\* cited by examiner

FIG.1

APPARATUS AND METHOD FOR BUFFERING CONTEXT ARRAYS REFERENCED FOR PERFORMING ENTROPY DECODING UPON MULTI-TILE ENCODED PICTURE AND RELATED ENTROPY DECODER

CROSS REFERENCE TO RELATED APPLICATIONS

This application claims the benefit of U.S. provisional application No. 61/553,350 (filed on Oct. 31, 2011) and U.S. provisional application No. 61/566,984 (filed on Dec. 5, 2011). The whole contents of these related applications are incorporated herein by reference.

TECHNICAL FIELD

The disclosed embodiments of the present invention relate to decoding a multi-tile video/image bitstream which transmits a plurality of multi-tile encoded pictures/compressed frames each having a plurality of tiles, and more particularly, to an apparatus and a method for buffering context arrays referenced for performing entropy decoding upon a multi-tile encoded picture and a related entropy decoder.

BACKGROUND

As proposed in High-Efficiency Video Coding (HEVC) specification, one picture can be partitioned into multiple tiles. FIG. 1 is a diagram illustrating tiles adopted in the HEVC specification. FIG. 2 is a diagram illustrating a conventional decoding order of the tiles shown in FIG. 1. As shown in FIG. 1, one picture 10 is partitioned into a plurality of tiles $T_{11}'$-$T_{13}'$, $T_{21}'$-$T_{23}'$, $T_{31}'$-$T_{33}'$ separated by row boundaries (i.e., horizontal boundaries) $HB_1'$, $HB_2'$ and column boundaries (i.e., vertical boundaries) $VB_1'$, $VB_2'$. Inside each tile, largest coding units (LCUs)/treeblocks (TBs) are raster scanned, as shown in FIG. 2. For example, LCUs/TBs orderly indexed by the Arabic numbers in the same tile $T_{11}$ are decoded sequentially. Inside each multi-tile picture, tiles are raster scanned, as shown in FIG. 2. For example, the tiles $T_{11}'$-$T_{13}'$, $T_{21}'$-$T_{23}'$ and $T_{31}'$-$T_{33}'$ are decoded sequentially. Specifically, one picture can be uniformly partitioned by tiles or partitioned into specified LCU-column-row tiles. A tile is a partition which has vertical and horizontal boundaries, and it is always rectangular with an integer number of LCUs/TBs included therein. Hence, tile boundaries must be LCU/TB boundaries.

There are two types of tiles, independent tiles and dependent tiles. As to the independent tiles, they are treated as sub-pictures/sub-streams. Hence, encoding/decoding LCUs/TBs of an independent tile (e.g., motion vector prediction, intra prediction, entropy coding, etc.) does not need data from other tiles. Besides, assume that data of the LCUs/TBs is encoded/decoded using arithmetic coding such as a context-based adaptive binary arithmetic coding (CABAC) algorithm. Regarding each independent tile, the CABAC statistics are initialized/re-initialized at the start of the tile, and the LCUs outside the tile boundaries of the tile are regarded as unavailable. For example, the CABAC statistics at the first LCU/TB indexed by "1" in the tile $T_{11}'$ would be initialized when decoding of the tile $T_{11}'$ is started, the CABAC statistics at the first LCU/TB indexed by "13" in the tile $T_{12}'$ would be re-initialized when decoding of the tile $T_{12}'$ is started, the CABAC statistics at the first LCU/TB indexed by "31" in the tile $T_{13}'$ would be re-initialized when decoding of the tile $T_{13}'$ is started, and the CABAC statistics at the first LCU/TB indexed by "40" in the tile $T_{21}'$ would be re-initialized when decoding of the tile $T_{21}'$ is started.

However, encoding/decoding LCUs/TBs of a dependent tile (e.g., motion vector prediction, intra prediction, entropy coding, etc.) has to consider data provided by other tiles. Hence, vertical and horizontal buffers are required for successfully decoding a multi-tile encoded picture/compressed frame having dependent tiles included therein. Specifically, the vertical buffer is used for buffering decoded information of LCUs/TBs of an adjacent tile beside a vertical boundary (e.g., a left vertical boundary) of a currently decoded tile, and the horizontal buffer is used for buffering decoded information of LCUs/TBs of another adjacent tile beside a horizontal boundary (e.g., a top horizontal boundary) of the currently decoded tile. As a result, the buffer size for decoding the multi-tile encoded picture/compressed frame would be large, leading to higher production cost. Besides, assume that data of the LCUs/TBs is encoded/decoded using arithmetic coding such as a CABAC algorithm. Regarding a dependent tile, the CABAC statistics may be initialized at the start of the tile or inherited from another tile. For example, the CABAC statistics at the first LCU/TB indexed by "1" in the tile $T_{11}'$ would be initialized when decoding of the tile $T_{11}'$ is started, the CABAC statistics at the first LCU/TB indexed by "13" in the tile $T_{12}'$ would be inherited from the CABAC statistics at the last LCU/TB indexed by "12" in the tile $T_{11}'$ when decoding of the tile $T_{12}'$ is started, the CABAC statistics at the first LCU/TB indexed by "31" in the tile $T_{13}'$ would be inherited from the CABAC statistics at the last LCU/TB indexed by "30" in the tile $T_{12}'$ when decoding of the tile $T_{13}'$ is started, and the CABAC statistics at the first LCU/TB indexed by "40" in the tile $T_{21}'$ would be inherited from the CABAC statistics at the last LCU/TB indexed by "39" in the tile $T_{13}'$ when decoding of the tile $T_{21}'$ is started.

As the conventional decoder design employs a tile scan order for decoding a multi-tile encoded picture, the vertical buffer (column buffer) is necessitated by the tile scan order for buffering decoded information of LCUs/TBs of an adjacent tile beside a vertical boundary (e.g., a left vertical boundary) of a currently decoded dependent tile, which increases the production cost inevitably. Thus, there is a need for an innovative entropy decoder design which is capable of reducing or omitting the vertical buffer (column buffer) when decoding the multi-tile encoded picture/compressed frame.

SUMMARY

In accordance with exemplary embodiments of the present invention, an apparatus and a method for buffering context arrays referenced for performing entropy decoding upon a multi-tile encoded picture and a related entropy decoder, to solve the above-mentioned problems.

According to a first aspect of the present invention, an exemplary buffering apparatus for buffering context arrays of a multi-tile encoded picture having a plurality of tiles is disclosed. The exemplary buffering apparatus includes a first buffer and a second buffer. The first buffer is arranged to buffer a first context array referenced for performing entropy decoding upon a first tile of the multi-tile encoded picture. The second buffer is arranged to buffer a second context array referenced for performing entropy decoding upon a second tile of the multi-tile encoded picture. When the first tile is currently decoded according to the first context array buffered in the first buffer, the second context array is buffered in the second buffer.

According to a second aspect of the present invention, an exemplary buffering method for buffering context arrays of a multi-tile encoded picture having a plurality of tiles is disclosed. The exemplary buffering method includes: buffering a first context array referenced for performing entropy decoding upon a first tile of the multi-tile encoded picture; and buffering a second context array referenced for performing entropy decoding upon a second tile of the multi-tile encoded picture when the first tile is currently decoded according to the buffered first context array.

According to a third aspect of the present invention, an exemplary entropy decoder is disclosed. The exemplary entropy decoder includes an entropy decoding core and a buffering apparatus. The entropy decoding core is arranged to perform entropy decoding upon a multi-tile encoded picture, having a plurality of tiles included therein, in a raster scan order, wherein the entropy decoding core starts decoding a portion of a current tile after decoding a portion of a previous tile. The buffering apparatus is coupled to the entropy decoding core, and arranged for buffering context arrays of the multi-tile encoded picture. The buffering apparatus includes a first buffer and a second buffer. The first buffer is arranged to buffer a first context array referenced for entropy decoding a first tile of the multi-tile encoded picture. The second buffer is arranged to buffer a second context array referenced for entropy decoding a second tile of the multi-tile encoded picture. When the first tile is currently decoded according to the first context array buffered in the first buffer, the second context array is buffered in the second buffer.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

Figure 1:
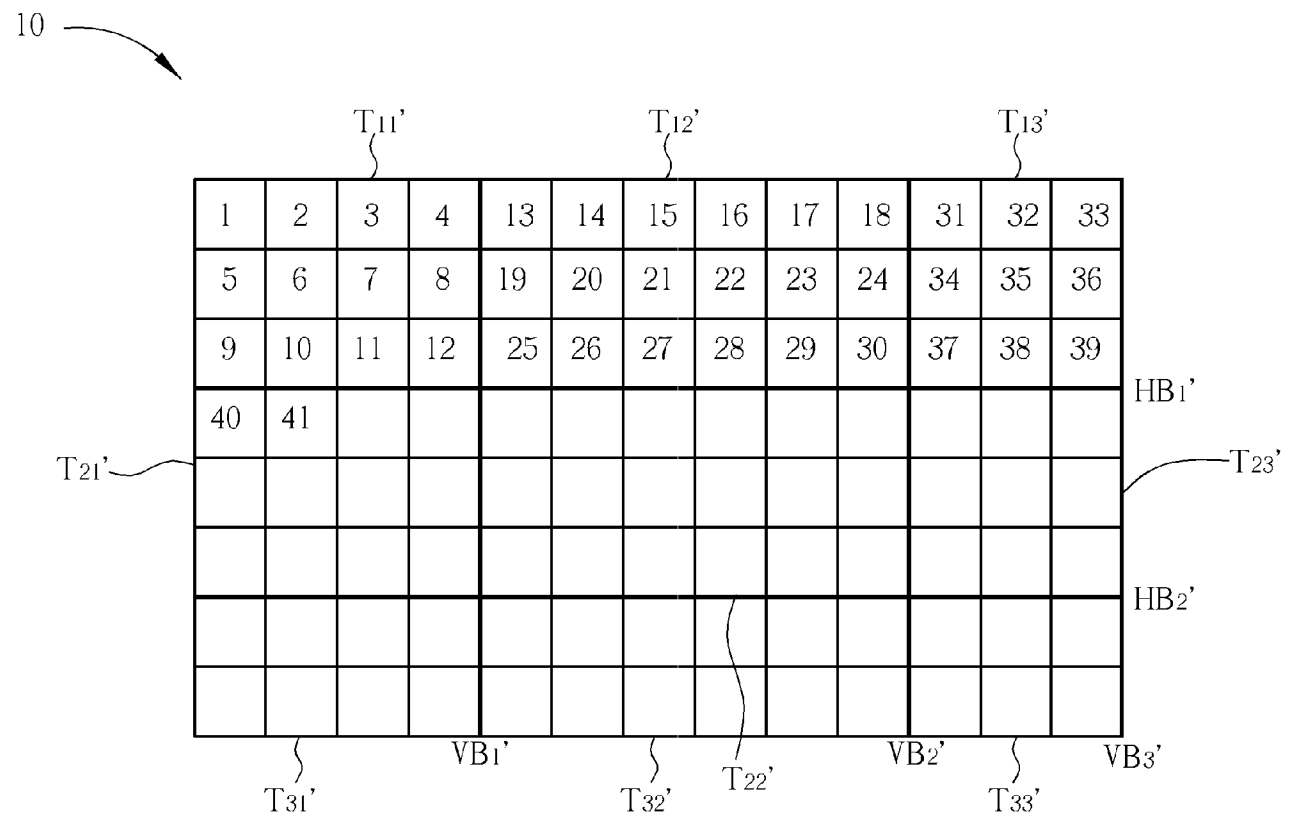

FIG. 1 is a diagram illustrating tiles adopted in the HEVC specification.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 3:
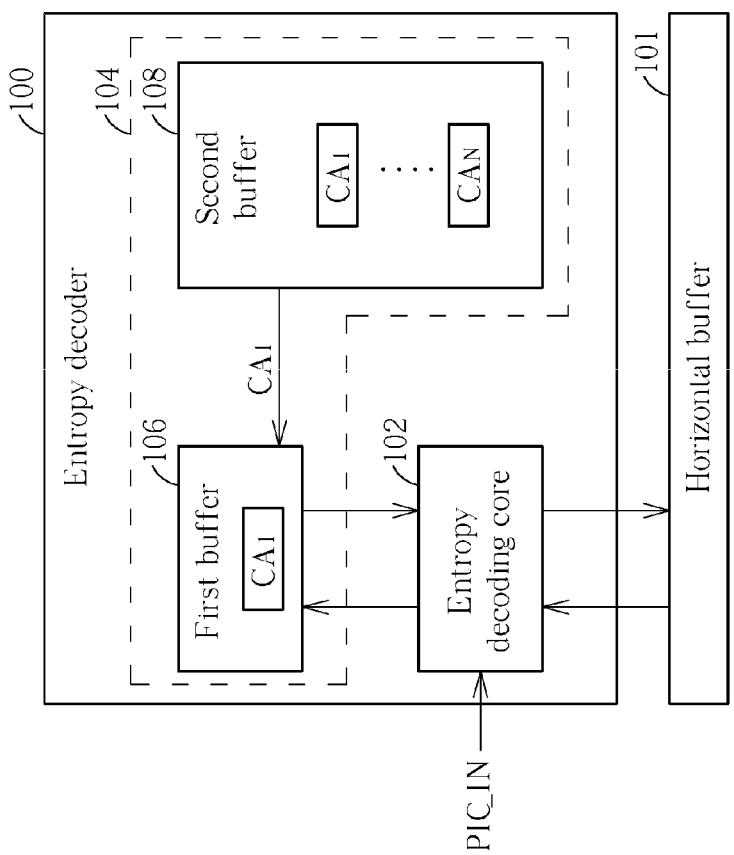
FIG. 3 is a diagram illustrating an entropy decoder according to a first embodiment of the present invention.

FIG. 3 is a diagram illustrating an entropy decoder according to a first embodiment of the present invention. The exemplary entropy decoder 100 includes an entropy decoding core 102 and a buffering apparatus 104, where the buffering apparatus 104 is coupled to the entropy decoding core 102, and has a first buffer 106 and a second buffer 108. It should be noted that only the elements pertinent to the present invention are illustrated in FIG. 3. In practice, the entropy decoder 100 is allowed to have additional elements included therein to support more functions. The entropy decoding core 102 is arranged to perform entropy decoding upon a multi-tile encoded picture PIC_IN, having a plurality of tiles included therein, in a raster scan order. Therefore, the entropy decoding core 102 starts decoding a portion of a current tile after decoding a portion of a previous tile. It should be noted that the proposed decoding method/decoding order may be applied to independent tiles or dependent tiles. In the following, an example of decoding independent tiles is provided for illustrative purposes only, and is not meant to be a limitation of the present invention.

Figure 2:
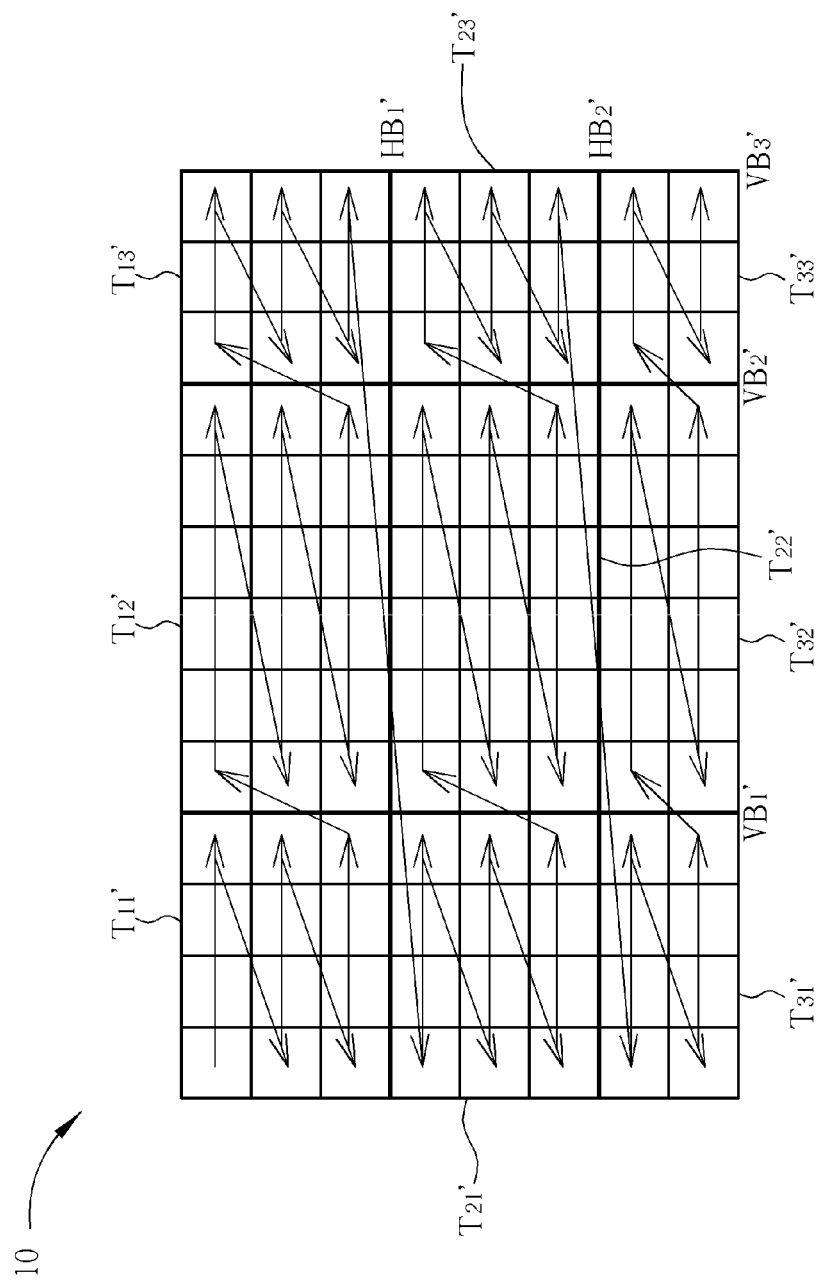
FIG. 2 is a diagram illustrating a conventional decoding order of the tiles shown in FIG. 1.
Figure 4:
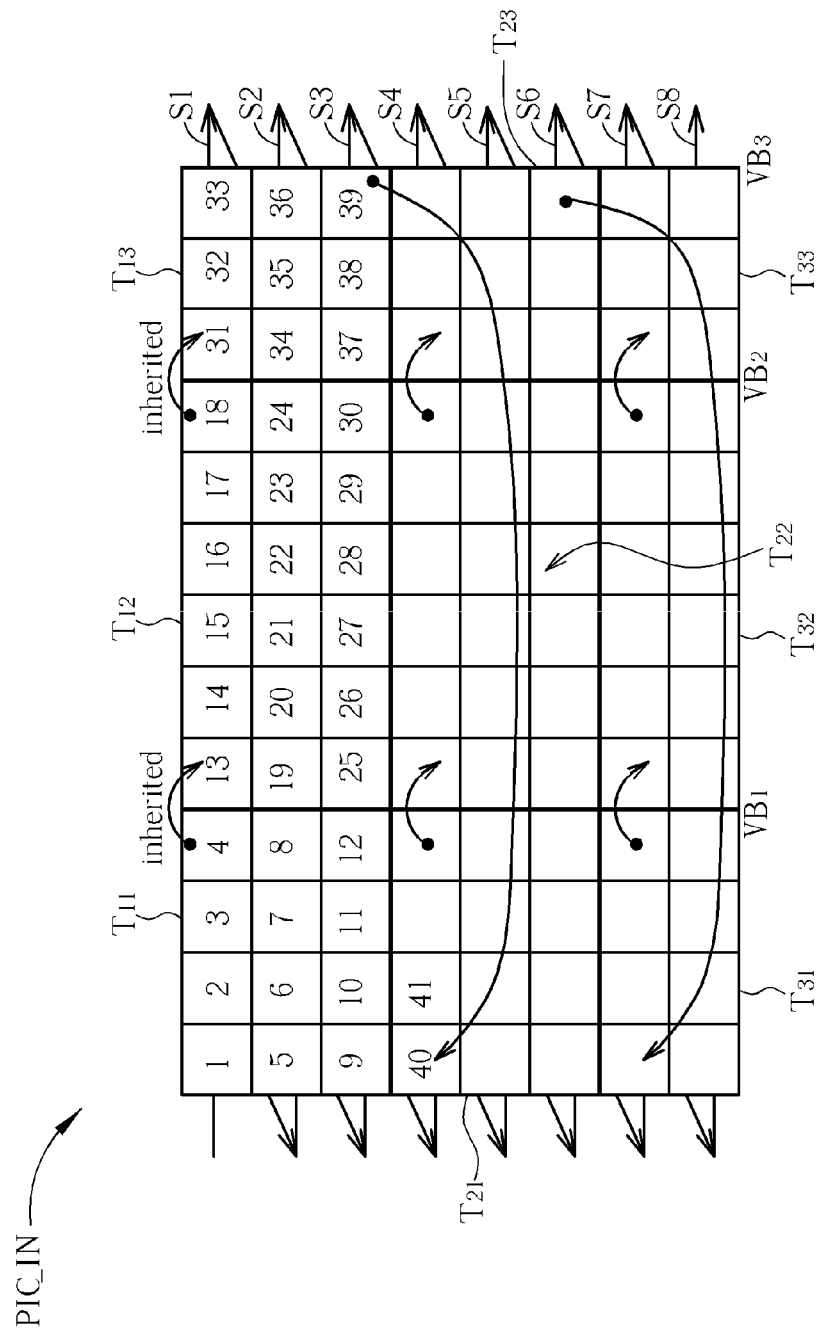
FIG. 4 is a diagram illustrating an exemplary entropy decoding operation performed by the entropy decoder shown in FIG. 3.
Figure 5:
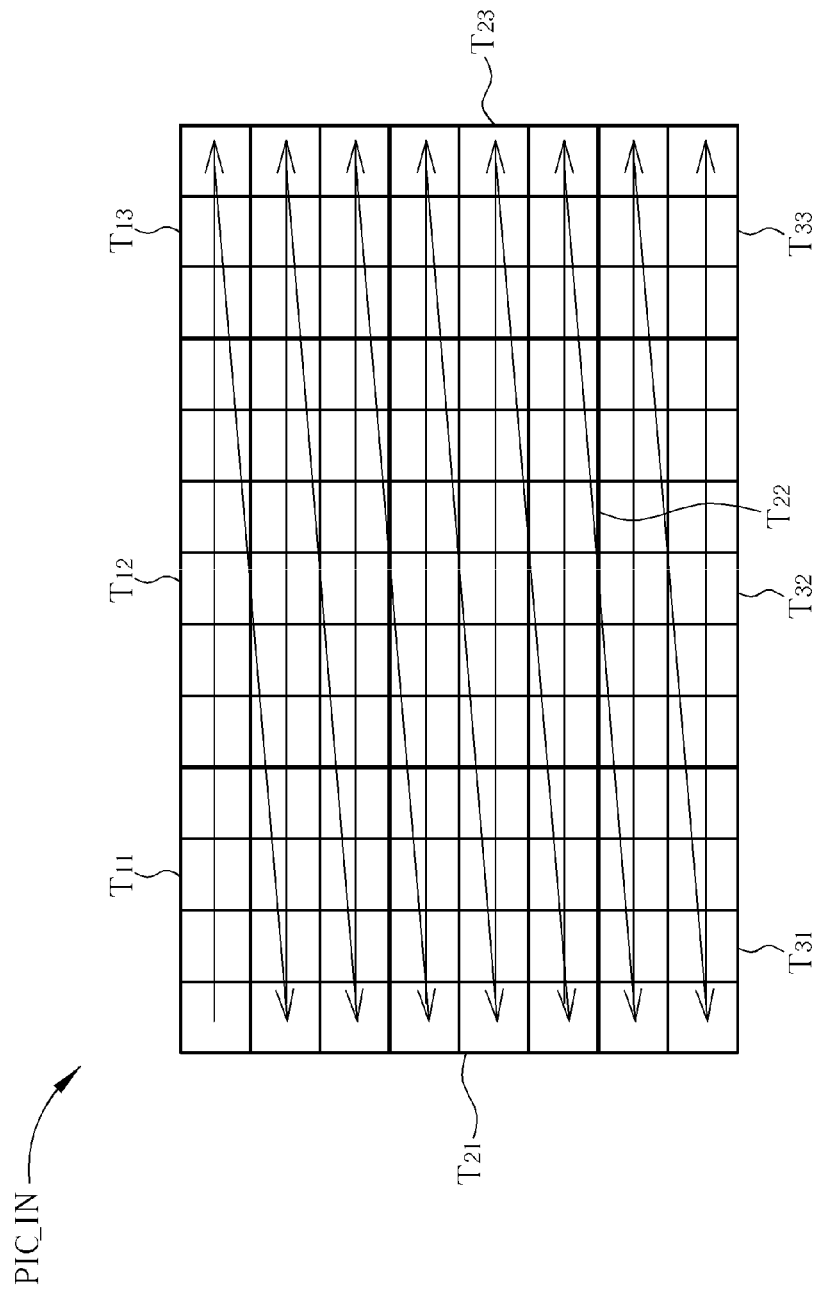
FIG. 5 is a diagram illustrating a proposed decoding order of the tiles shown in FIG. 4 according to an embodiment of the present invention.

Please refer to FIG. 4, which is a diagram illustrating an exemplary entropy decoding operation performed by the entropy decoder 100 shown in FIG. 3. The multi-tile encoded picture PIC_IN is partitioned into a plurality of tiles (e.g., nine dependent tiles $T_{11}$-$T_{33}$ in this embodiment). Each of the tiles $T_{11}$-$T_{33}$ is composed of a plurality of LCUs/TBs. If a conventional decoding manner is employed, the LCU/TB index values shown in FIG. 4 indicate the conventional decoding order of the LCUs/TBs included in the multi-tile encoded picture PIC_IN. Specifically, regarding a conventional decoder design, the decoding order in a multi-tile encoded picture with tiles has a raster scan sequence for LCUs/TBs in each tile and a raster scan sequence for the tiles, as shown in FIG. 2. In contrast to the conventional decoder design, the proposed decoder design of the present invention has the entropy decoding core 102 configured to decode all LCUs/TBs of the whole multi-tile encoded picture PIC_IN in a raster scan manner, where the decoding order includes successive decoding sequences S1-S8 as shown in FIG. 4. For example, the LCUs/TBs, located at the first row shown in FIG. 4 and belonging to different tiles $T_{11}$, $T_{12}$ and $T_{13}$, are sequentially decoded from the left-most LCU/TB to the right-most LCU/TB as indicated by the decoding sequence S1; the LCUs/TBs, located at the second row shown in FIG. 4 and belonging to different tiles $T_{11}$, $T_{12}$ and $T_{13}$, are sequentially decoded from the left-most LCU/TB to the right-most LCU/TB as indicated by the decoding sequence S2 following the decoding sequence S1; and the LCUs/TBs, located at the third row shown in FIG. 4 and belonging to different tiles $T_{11}$, $T_{12}$ and $T_{13}$, are sequentially decoded from the left-most LCU/TB to the right-most LCU/TB as indicated by the decoding sequence S3 following the decoding sequence S2. For clarity, please refer to FIG. 5, which is a diagram illustrating a proposed decoding order of the tiles shown in FIG. 4 according to an embodiment of the present invention. By using the entry point of each tile bitstream/partition, a decoder can use raster scan of LCUs/TBs (as shown in FIG. 5) instead of tile scan of LCUs/TBs (as shown in FIG. 2). Hence, due to the proposed raster scan order, no vertical buffer (column buffer) is needed for buffering decoded information of LCUs/TBs of an adjacent tile. In this way, the production cost can be effectively reduced. It should be noted that the proposed raster scan order may be employed for decoding independent tiles or dependent tiles.

In this embodiment, data of the LCUs/TBs is encoded using a context-based adaptive binary arithmetic coding (CABAC) algorithm. Hence, the context model, which is a probability model, should be properly selected and updated during the entropy decoding of the multi-tile encoded picture PIC_IN. It should be noted that the entropy decoding core 102 does not necessarily re-initialize the CABAC statistics at the first LCU/TB of each tile. That is, the CABAC statistics at the first LCU/TB of a current tile may be inherited from the CABAC statistics at a specific LCU/TB of a previous tile horizontally adjacent to the current tile, where the first LCU/TB and the specific LCU/TB are horizontally adjacent to each other and located at opposite sides of a tile boundary (i.e., a vertical/column boundary) between the current tile and the previous tile. As can be seen from FIG. 4, the initial CABAC statistics at the first LCU/TB indexed by "13" in the tile $T_{12}$ is inherited from the CABAC statistics updated at the LCU/TB indexed by "4" in the tile $T_{11}$; similarly, the initial CABAC statistics at the first LCU/TB indexed by "31" in the tile $T_{13}$ is inherited from the CABAC statistics updated at the LCU/TB indexed by "18" in the tile $T_{12}$. The tiles $T_{11}$-$T_{13}$ are horizontally adjacent tiles, i.e., horizontal partitions. However, the tiles $T_{11}$, $T_{21}$, and $T_{31}$ are vertically adjacent tiles, i.e., vertical partitions. Regarding the tile $T_{21}$ which is vertically adjacent to the tile $T_{11}$, the initial CABAC statistics at the first LCU/TB indexed by "40" in the tile $T_{21}$ would be inherited from the CABAC statistics updated at the last LCU/TB indexed by "39" in the tile $T_{13}$. As the initial setting of the CABAC statistics for the rest of the tiles can be easily deduced by analogy, further description is omitted for brevity.

The entropy decoding core 102 employs the decoding order including successive decoding sequences S1-S8. Hence, the LCUs/TBs in the same tile are not decoded continuously due to the fact that the entropy decoding core 102 starts decoding a portion of a current tile after decoding a portion of a previous tile. As can be seen from FIG. 4, after the LCUs/TBs indexed by "1", "2", "3" and "4" of the tile $T_{11}$ are successively decoded, the next LCU/TB to be decoded by the entropy decoding core 102 would be the first LCU/TB indexed by "13" in the next tile $T_{12}$ rather than the LCU/TB indexed by "5" in the current tile $T_{11}$; after the LCUs/TBs indexed by "13", "14", "15", "16", "17" and "18" of the tile $T_{12}$ are successively decoded, the next LCU/TB to be decoded by the entropy decoding core 102 would be the first LCU/TB indexed by "31" in the next tile $T_{13}$ rather than the LCU/TB indexed by "19" in the current tile $T_{12}$; and after the LCUs/TBs indexed by "31", "32" and "33" of the tile $T_{13}$ are successively decoded, the next LCU/Tb to be decoded by the entropy decoding core 102 would be the first LCU/TB indexed by "5" in the previously processed tile $T_{11}$ rather than the LCU/TB indexed by "34" in the current tile $T_{13}$. Therefore, information of the context/probability model currently obtained by a partially decoded tile should be buffered/maintained since the LCUs/TBs in the same tile are not decoded by the entropy decoding core 102 continuously.

The buffering apparatus 104 is implemented for buffering context arrays of the multi-tile encoded picture PIC_IN. The context arrays include context models each being a probability model for one or more bins of the binarized symbol in the arithmetic coding, such as CABAC in H.264 and HEVC. A context model may be chosen from a selection of available models, depending on the statistics of recently-coded data symbols. The context model stores the probability of each bin being "1" or "0". Details of the context model can be found in a published paper: Marpe et al., "Context-Based Adaptive Binary Arithmetic Coding in the H.264/AVC Video Compression Standard", IEEE TRANSACTIONS ON CIRCUITS AND SYSTEMS FOR VIDEO TECHNOLOGY, VOL. 13, NO. 7, July 2003, which is incorporated herein by reference. Further description is therefore omitted here for brevity.

By way of example, but not limitation, the number of buffered context arrays maintained by the buffering apparatus 104 during entropy decoding of the multi-tile encoded picture PIC_IN depends on the partitioning setting of the multi-tile encoded picture PIC_IN. For example, when the multi-tile encoded picture PIC_IN has N horizontally adjacent partitions (i.e., N horizontal partitions/tiles at the same row), the number of buffered context arrays maintained by the buffering apparatus 104 during entropy decoding of the multi-tile encoded picture is equal to N. Regarding the example shown in FIG. 4, N is equal to 3. Hence, there are 3 context arrays concurrently maintained in the buffering apparatus 104, where each of the context arrays records information of the context/probability model needed for performing entropy decoding upon a corresponding tile. Technical features of the buffering apparatus 104 are detailed as below.

Figure 6:
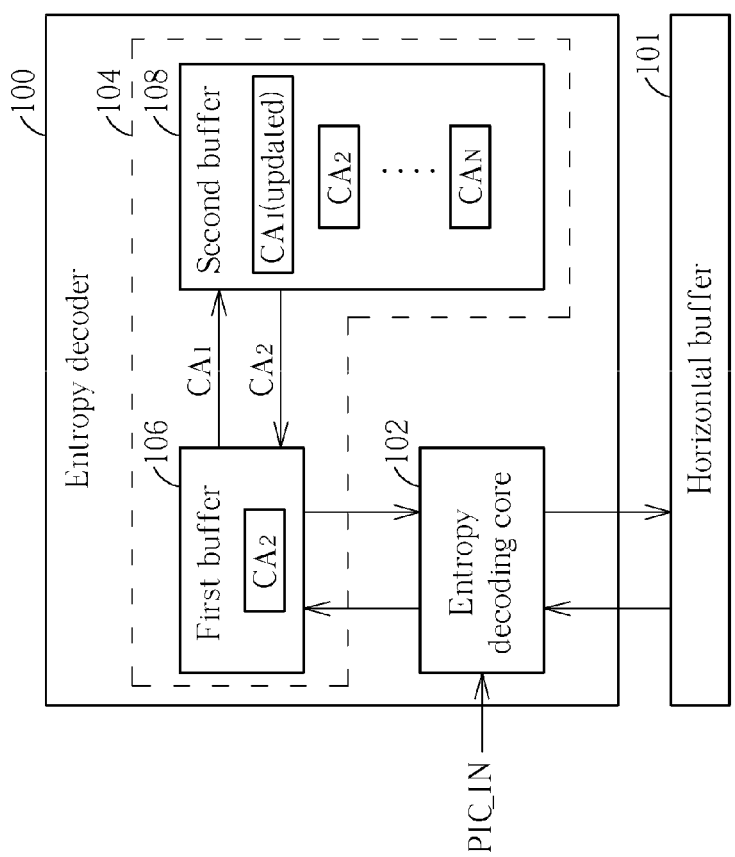
FIG. 6 is a diagram illustrating the entropy decoder which stores a currently used context array into a second buffer and loads a context array needed for decoding a next tile into a first buffer.

The first buffer 106 and the second buffer 512 may be allocated in the same storage device or implemented using separate storage devices, depending upon actual design consideration. For example, the first buffer 106 may be implemented using a register of the entropy decoder 100, and the second buffer 104 may be implemented using an internal buffer (e.g., a static random access memory (SRAM)) of the entropy decoder 100. The first buffer 106 is arranged to buffer a context array (e.g., $CA_1$) referenced for performing entropy decoding upon a specific tile of the multi-tile encoded picture PIC_IN, and the second buffer 108 is arranged to buffer context arrays (e.g., $CA_2$-$CA_N$) referenced for performing entropy decoding upon other tiles of the multi-tile encoded picture PIC_IN, where N is equal to the number of horizontally adjacent partitions (i.e., horizontal partitions/tiles at the same row). When the specific tile is currently decoded according to the context array $CA_1$ buffered in the first buffer 106, the context arrays $CA_2$-$CA_N$ are buffered/maintained in the second buffer 108. That is, the first buffer 106 stores a context array of a currently decoded tile, and the second buffer 108 stores context arrays of other tiles which are not currently decoded. When the entropy decoding of the specific tile encounters a tile boundary (e.g., a right vertical/column boundary), the currently used context array $CA_1$ is stored into the second buffer 108 to update the original context array $CA_1$ stored in the second buffer 108, and the context array $CA_2$ needed for decoding the next tile is loaded into the first buffer 106, as shown in FIG. 6. Thus, during the entropy decoding of the multi-tile encoded picture PIC_IN, context arrays for different tiles are concurrently maintained by the buffering apparatus 104, thereby facilitating the discontinuous entropy decoding of LCUs/TBs in each tile.

Figure 7:
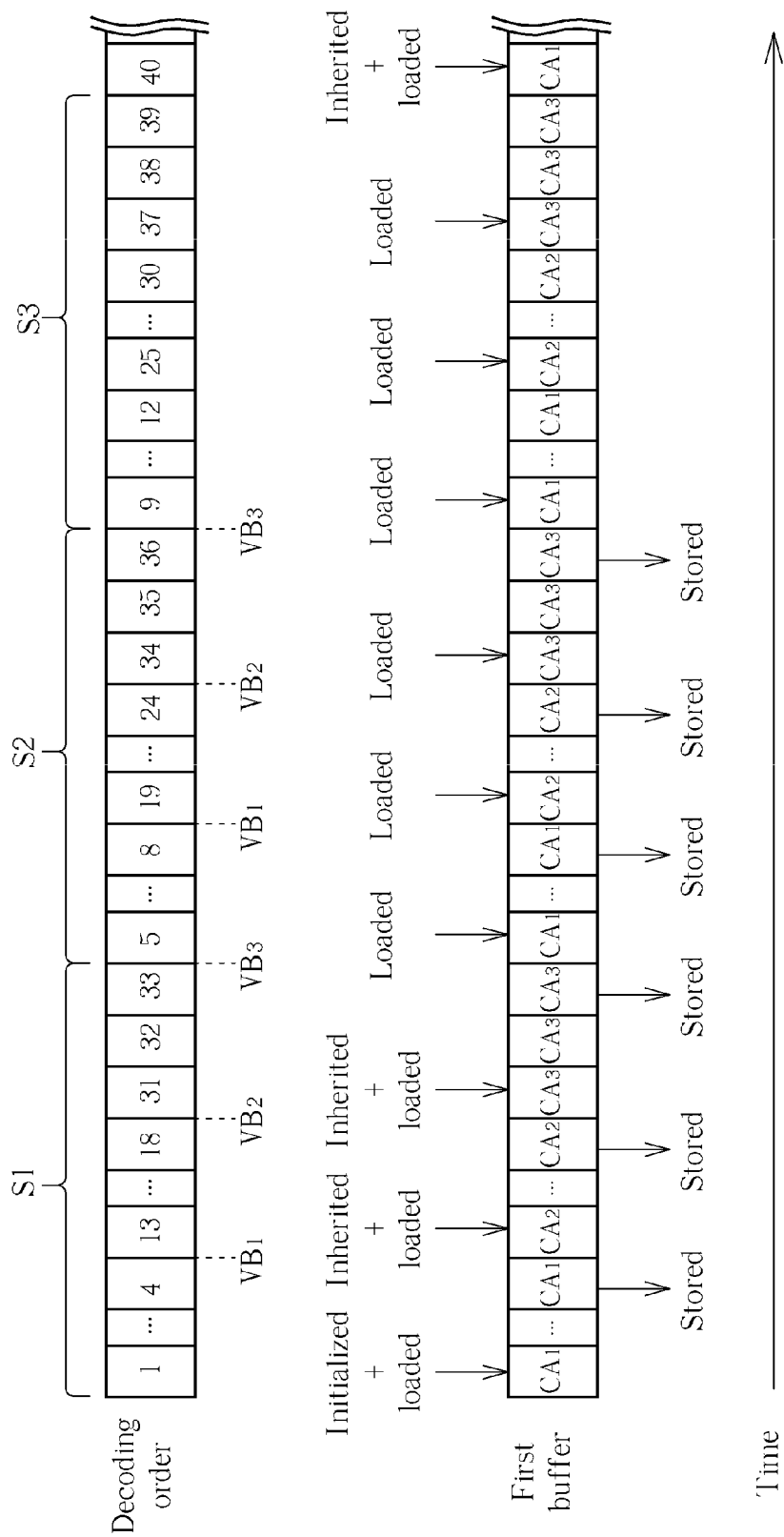
FIG. 7 is a diagram illustrating an exemplary buffer maintenance operation of the buffering apparatus shown in FIG. 3.

An exemplary buffer maintenance operation of the buffering apparatus 104 is described with reference to FIG. 7. Supposing that the multi-tile encoded picture PIC_IN has the partition setting shown in FIG. 4, the number of maintained context arrays is equal to 3 (i.e., N=3). In the beginning, the context array $CA_1$ at the LCU/TB indexed by "1" (i.e., the initial context array $CA_1$ for the tile $T_{11}$) is initialized and loaded into the first buffer 106 by the entropy decoding core 102. When the entropy decoding of the tile $T_{11}$ encounters a tile boundary (e.g., a vertical/column boundary $VB_1$), the context array $CA_1$ updated at the LCU/TB indexed by "4" is stored into the second buffer 108, and the context array $CA_2$ at the LCU/TB indexed by "13" (i.e., the initial context array $CA_2$ for the tile $T_{12}$) is inherited from the context array $CA_1$ updated at the LCU/TB indexed by "4" and loaded into the first buffer 106. When the entropy decoding of the tile $T_{12}$ encounters a tile boundary (e.g., a vertical/column boundary $VB_2$), the context array $CA_2$ updated at the LCU/TB indexed by "18" is stored into the second buffer 108, and the context array $CA_3$ at the LCU/TB indexed by "31" (i.e., the initial context array $CA_3$ for the tile $T_{13}$) is inherited from the context array $CA_2$ updated at the LCU/TB indexed by "18" and loaded into the first buffer 106. When the entropy decoding of the tile $T_{13}$ encounters a tile boundary (e.g., a vertical/column boundary $VB_3$), the context array $CA_3$ updated at the LCU/TB indexed by "33" is stored into the second buffer 108, and the context array $CA_1$ needed to resume decoding the LCU/TB indexed by "5" is read from the second buffer 108 and then loaded into the first buffer 106. As a person skilled in the art can readily understand loading and storing of the context arrays required for decoding the following LCUs/TBs by referring to FIG. 7, further description is omitted here for brevity.

As mentioned above, the entropy decoding core 102 decodes all LCUs/TBs of the whole multi-tile encoded picture PIC_IN in a raster scan manner, where the decoding order includes successive decoding sequences S1-S8 as shown in FIG. 4. Therefore, only the horizontal buffer 101 is needed to buffer decoded information of LCUs/TBs of an adjacent tile beside a horizontal/row boundary (e.g., a top horizontal/row boundary) of a currently decoded tile. Since there is no vertical buffer needed for buffering decoded information of LCUs/TBs of an adjacent tile beside a vertical/column boundary (e.g., a left vertical/column boundary) of the currently decoded tile, the overall buffer size required by a video decoder is reduced, thus decreasing the production cost accordingly.

As the first buffer 106 is used to maintain a context array of one currently decoded tile and the second buffer 108 is used to maintain context arrays of other tiles that are not currently decoded, the context arrays are loaded and stored between the first buffer 106 and the second buffer 108. If the first buffer 106 is a register or an internal buffer (e.g., SRAM) of the entropy decoder and the second buffer 108 is an external buffer such as a dynamic random access memory (DRAM), the decoding performance of the entropy decoder may be degraded due to read/write latency of the external buffer. The present invention therefore proposes a modified entropy decoder with enhanced buffer read/write efficiency.

Figure 8:
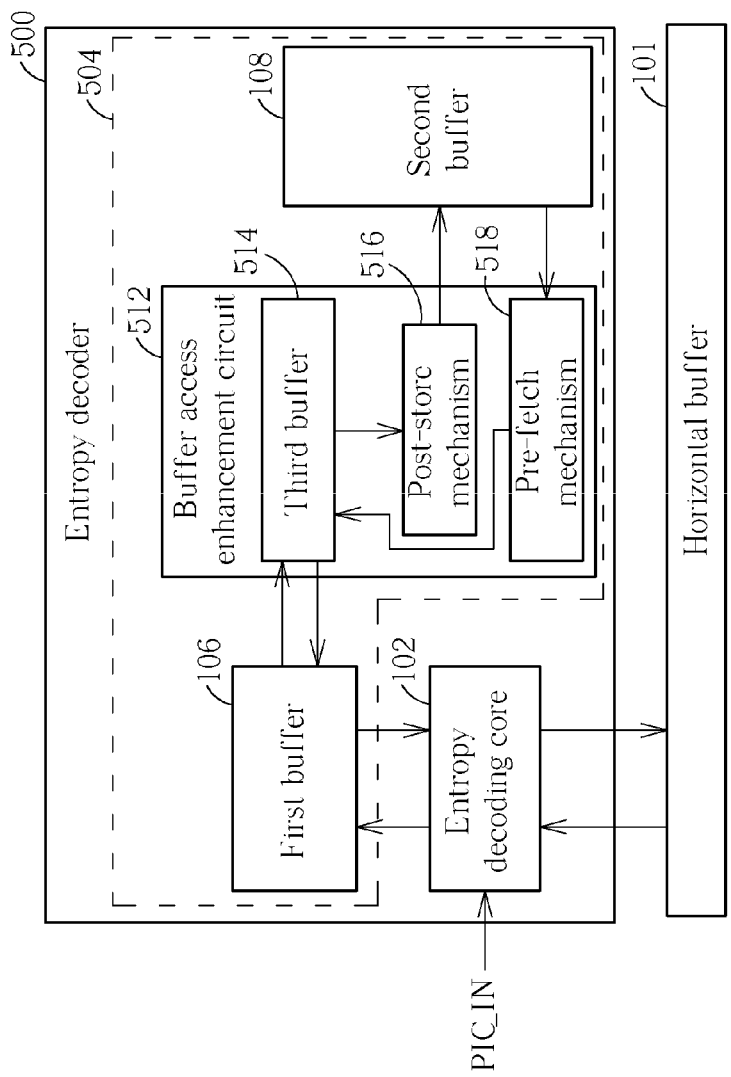
FIG. 8 is a diagram illustrating an entropy decoder according to a second embodiment of the present invention.

Please refer to FIG. 8, which is a diagram illustrating an entropy decoder according to a second embodiment of the present invention. The entropy decoder 500 has a buffer access enhancement circuit 512 coupled between the first buffer 106 and the second buffer 108, where the buffer access enhancement circuit 512 includes a third buffer 514, a post-store mechanism 516, and a pre-fetch mechanism 518. By way of example, but not limitation, the first buffer 106, the buffer access enhancement circuit 512 and the entropy decoding core 102 may be disposed in the same chip, and the second buffer 108 may be an off-chip storage device. For example, the first buffer 106 may be a register, the third buffer 514 may be an internal buffer (e.g., SRAM), and the second buffer 108 may be an external buffer (e.g., DRAM). However, this is for illustrative purposes, and is not meant to be a limitation of the present invention.

The pre-fetch mechanism 518 is used for pre-fetching a context array (e.g., $CA_2$ shown in FIG. 6) from the second buffer 108 and temporarily storing the pre-fetched context array in the third buffer 514. Therefore, when the pre-fetched context array is needed by the entropy decoding core 102, the pre-fetched context array in the third buffer 514 may be quickly loaded into the first buffer 106. The post-store mechanism 516 is used for post-storing a context array (e.g., $CA_1$ shown in FIG. 6), which is read from the first buffer 106 and temporarily stored in the third buffer 514, into the second buffer 108. Therefore, the context array read from the first buffer 106 is not required to be immediately transferred to the second buffer 108. In this way, the read latency and write latency of the second buffer 108 can be concealed to effectively reduce the time consumed on loading and storing context arrays.

In the embodiment shown in FIG. 8, the buffer access enhancement circuit 512 is configured to support both of the post-store function and the pre-fetch function. However, the buffer access enhancement circuit 512 may be modified to support only one of the post-store function and the pre-fetch function. Specifically, in a case where the buffer access enhancement circuit 512 is modified to omit the post-store mechanism 516, enhanced buffer reading efficiency of the second buffer 108 is achieved via the pre-fetch mechanism 518. In another case where the buffer access enhancement circuit 512 is modified to omit the pre-fetch mechanism 518, enhanced buffer writing efficiency of the second buffer 108 is achieved via the post-store mechanism 516. These alternative designs all fall within the scope of the present invention.

Figure 9:
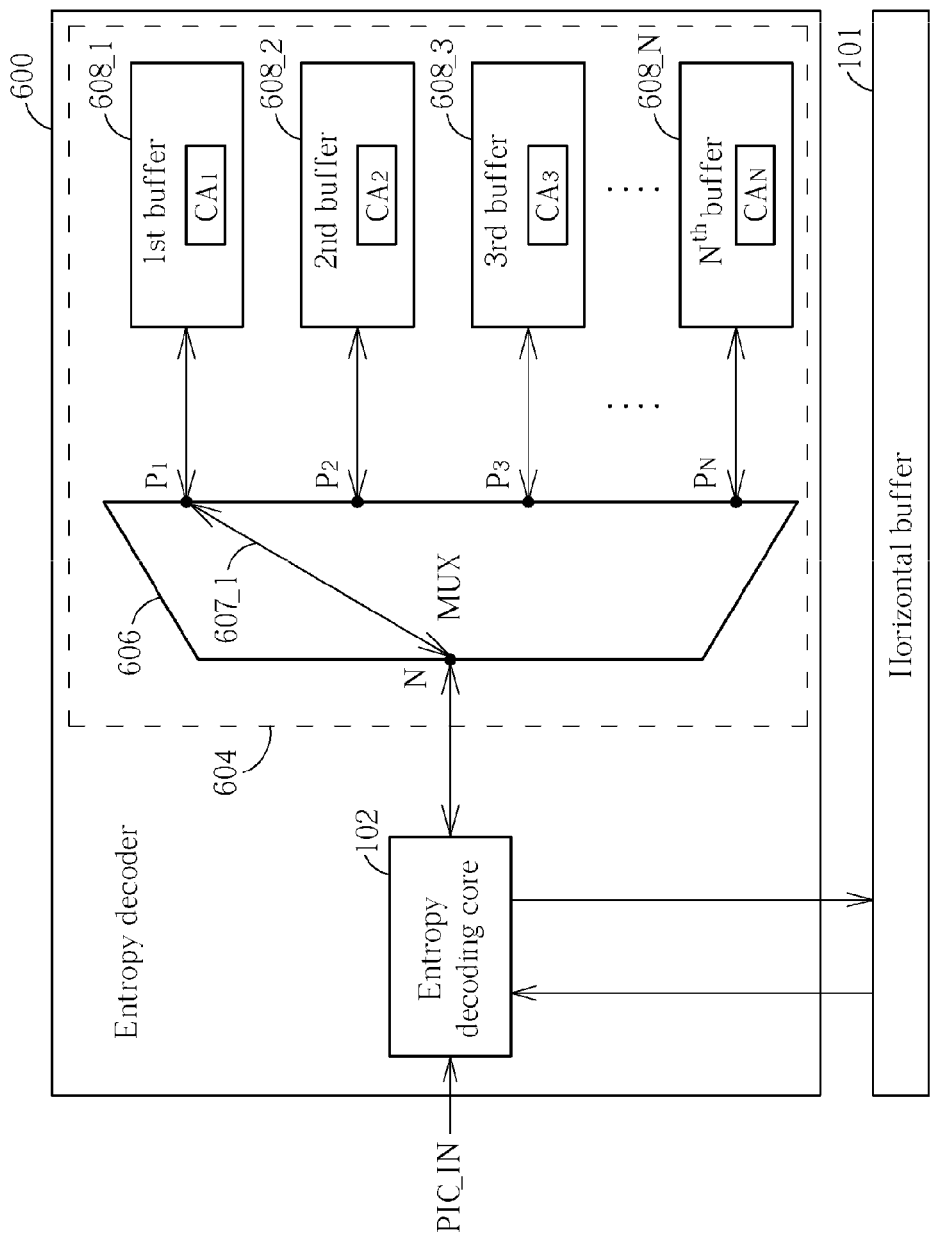
FIG. 9 is a diagram illustrating an entropy decoder according to a third embodiment of the present invention.

The entropy decoder 500 in FIG. 8 employs the buffer access enhancement circuit 512 to mitigate the decoding performance degradation caused by the buffer read/write latency. However, using a different decoder configure to achieve the same objective is feasible. Please refer to FIG. 9, which is a diagram illustrating an entropy decoder according to a third embodiment of the present invention. The exemplary entropy decoder 600 includes the aforementioned entropy decoding core 102 and a buffering apparatus 604, where the buffering apparatus 604 is coupled to the entropy decoding core 102, and has a multiplexer 606 and a plurality of buffers 608_1, 608_2 . . . 608_N. It should be noted that only the elements pertinent to the present invention are illustrated in FIG. 9. In practice, the entropy decoder 600 is allowed to have additional elements included therein to support more functions. As mentioned above, the entropy decoding core 102 is arranged to perform entropy decoding upon the multi-tile encoded picture PIC_IN, having a plurality of tiles included therein, in a raster scan order as shown in FIG. 4. Since the entropy decoding core 102 employs the decoding order including successive decoding sequences S1-S8, the LCUs/TBs in the same tile are not decoded continuously. In other words, the entropy decoding core 102 starts decoding a portion of a current tile after decoding a portion of a previous tile. Hence, information of the context/probability model currently obtained by a partially decoded tile should be buffered/maintained due to the fact that the LCUs/TBs in the same tile are not decoded continuously. Thus, the buffering apparatus 604 is implemented for buffering context arrays of the multi-tile encoded picture PIC_IN. By way of example, but not limitation, the number of buffered context arrays maintained by the buffering apparatus 604 during entropy decoding of the multi-tile encoded picture PIC_IN depends on the partitioning setting of the multi-tile encoded picture PIC_IN. For example, when the multi-tile encoded picture PIC_IN has N horizontally adjacent partitions (i.e., N horizontal partitions/tiles at the same row), the number of buffered context arrays maintained by the buffering apparatus 604 during entropy decoding of the multi-tile encoded picture is equal to N. Regarding the example shown in FIG. 4, N is set by 3. Therefore, there are 3 context arrays concurrently maintained in the buffering apparatus 604, where each of the context arrays records information of the context/probability model needed for performing entropy decoding upon a corresponding tile.

The buffers 608_1-608_N may be allocated in the same storage device or implemented using separate storage devices, depending upon actual design consideration. For example, the buffers 608_1-608_N may be implemented using registers, internal buffers (e.g., SRAMs), external buffers (e.g., DRAMs), or a combination thereof. The major difference between the buffering apparatuses 104 and 604 is that each of the buffers 608_1-608_N is dedicated to maintaining one context array. As can be seen from FIG. 9, context arrays $CA_1$, $CA_2$, ..., $CA_N$ referenced for performing entropy decoding upon different tiles are stored in the buffers 608_1-608_N, respectively. For example, the first buffer 608_1 is arranged to buffer a context array $CA_1$ referenced for performing entropy decoding upon the first tile of the multi-tile encoded picture PIC_IN, the second buffer 608_2 is arranged to buffer a context array $CA_2$ referenced for performing entropy decoding upon the second tile of the multi-tile encoded picture PIC_IN, the third buffer 608_3 is arranged to buffer a context array $CA_3$ referenced for performing entropy decoding upon the third tile of the multi-tile encoded picture PIC_IN, and the $N^{th}$ buffer 608_N is arranged to buffer a context array $CA_N$ referenced for performing entropy decoding upon the $n^{th}$ tile of the multi-tile encoded picture PIC_IN, where the $1^{st}$-$n^{th}$ tiles are horizontally adjacent tiles at the same row. In other words, N is equal to the number of horizontally adjacent partitions (i.e., horizontal partitions/tiles at the same row). The multiplexer (MUX) 606 is used to control which one of the buffers 608_1-608_N is allowed to be accessed by the entropy decoding core 102. The MUX 606 has a plurality of first connection ports $P_1$, $P_2$, $P_3$, ..., $P_N$ and a second connection port N, where the buffers 608_1-608_N are coupled to the first connection ports $P_1$-$P_N$, respectively, and the entropy decoding core 102 is coupled to the second connection port N. When the first tile is a current tile selected to be decoded by the entropy decoding core 102, the MUX 606 enables an interconnection 607_1 between the first connection port $P_1$ and the second connection port N, thus allowing the entropy decoding core 102 to access the context array $CA_1$ stored in the first buffer 608_1 and perform entropy decoding upon the first tile according to the context array $CA_1$. It should be noted that when the first tile is currently decoded according to the context array $CA_1$ buffered in the buffer 608_1, the context arrays $CA_2$-$CA_N$ are buffered/maintained in other buffers 608_1-608_N, respectively.

Figure 10:
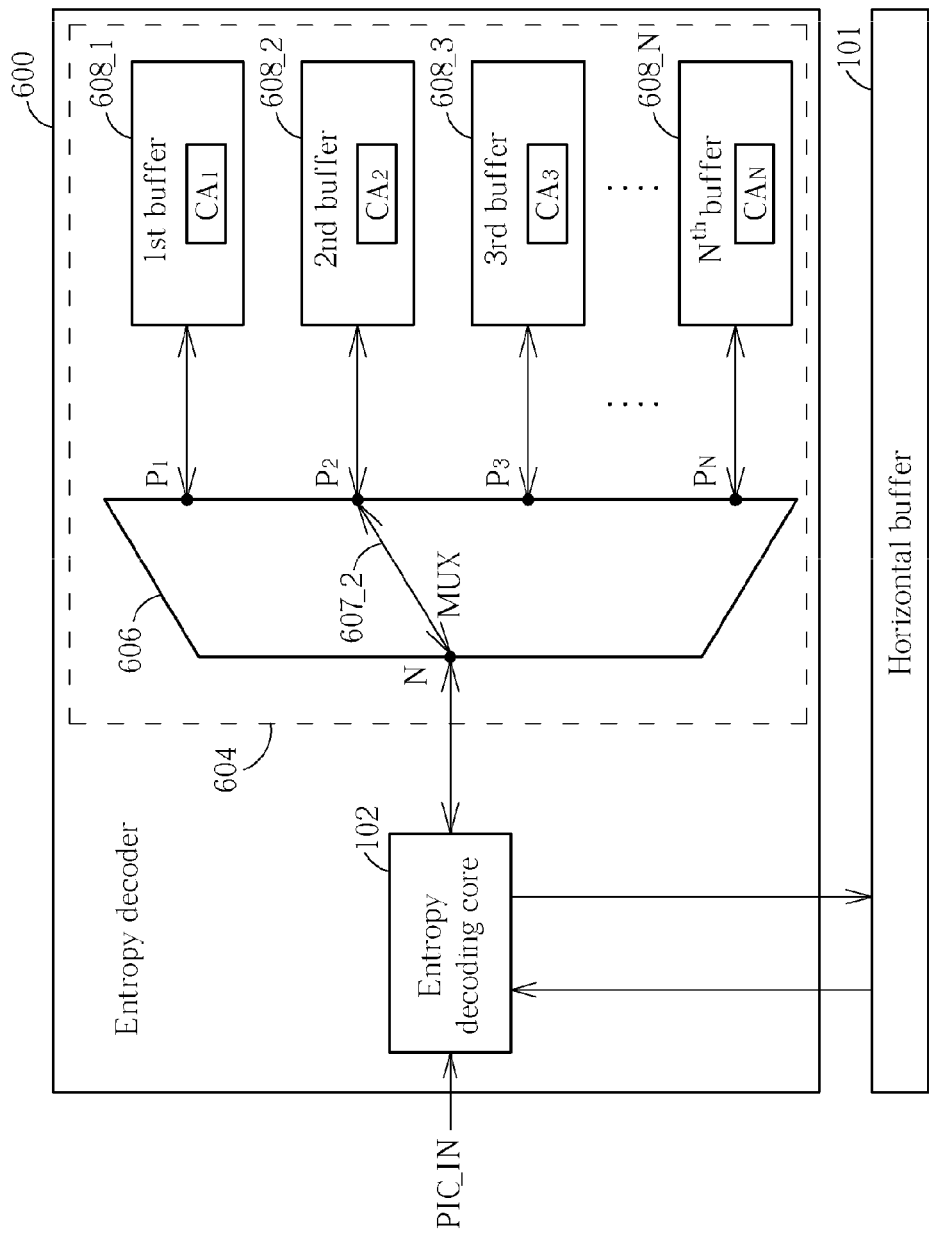
FIG. 10 is a diagram illustrating the entropy decoder which switches from one interconnection for accessing a context array used for decoding a current tile to another interconnection for accessing a context array needed for decoding a next tile.

When the entropy decoding of the first tile encounters a tile boundary (e.g., a right vertical/column boundary), the MUX 606 switches the interconnection 607_1 between the first connection port $P_1$ and the second connection port N to another interconnection 607_2 between the first connection port $P_2$ and the second connection port N, as shown in FIG. 10. Hence, the entropy decoding core 102 is allowed to access the context array $CA_2$ stored in the second buffer 608_2 and perform entropy decoding upon the second tile according to the context array $CA_2$.

To put it simply, during the entropy decoding of the multi-tile encoded picture PIC_IN, multiple context arrays for different tiles may be concurrently maintained by the buffering apparatus 604, thereby facilitating the discontinuous decoding of the LCUs/TBs in each tile. Besides, as the context arrays are buffered in respective designated buffers and selected under the control of a multiplexer, there is no loading and storing of context arrays between two buffers. In this way, the decoding performance of the entropy decoder may be improved by using a switchable hard-wired interconnection between the entropy decoding core and the buffers.

Figure 11:
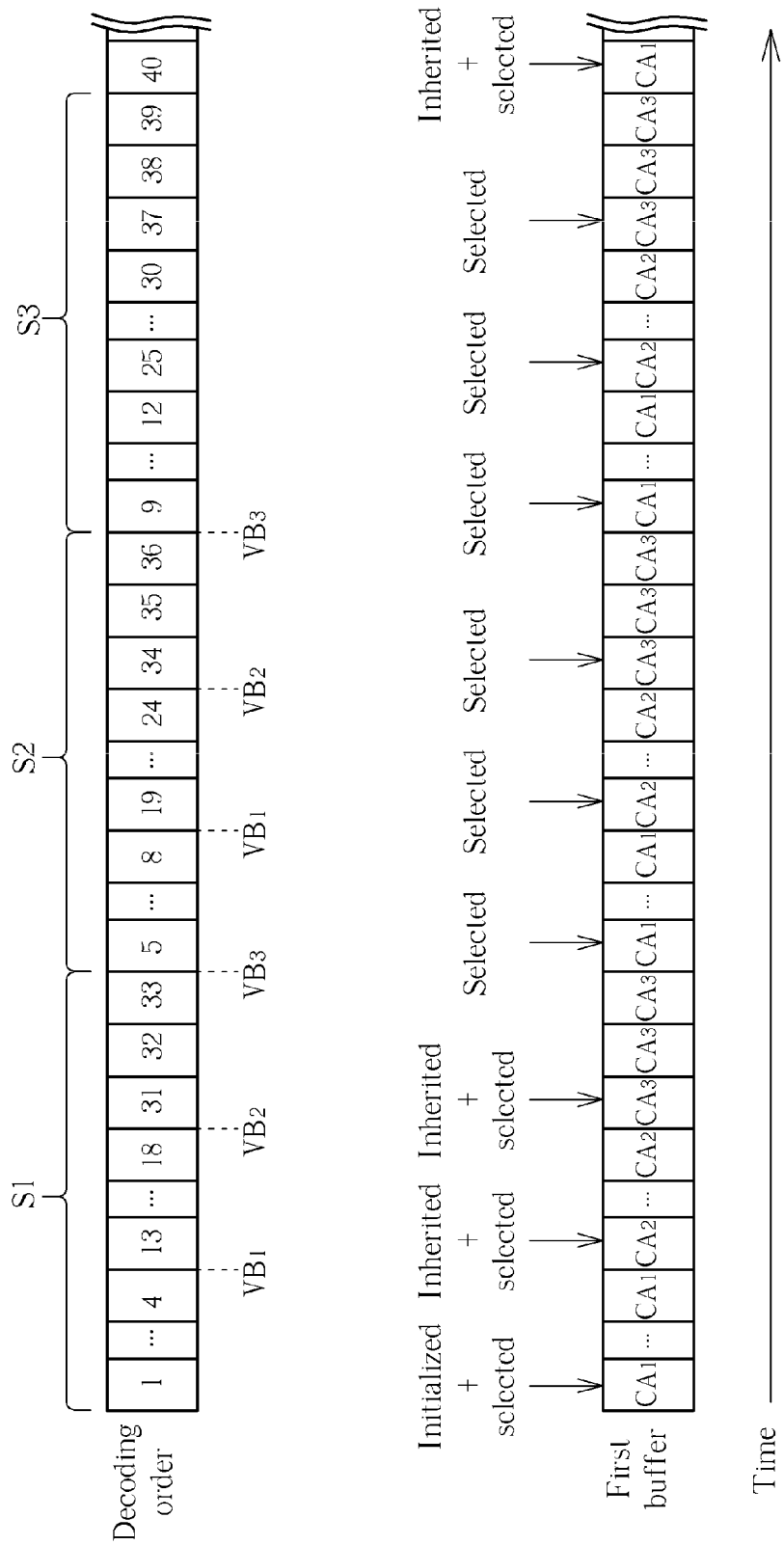
FIG. 11 is a diagram illustrating an exemplary buffer maintenance operation of the buffering apparatus shown in FIG. 9.

An exemplary buffer maintenance operation of the buffering apparatus 604 is described with reference to FIG. 11. Supposing that the multi-tile encoded picture PIC_IN has the partition setting shown in FIG. 4, the number of maintained context arrays is equal to 3 (i.e., N=3). Therefore, the buffering apparatus 604 would be configured to have three buffers 608_1-608_3 only. In the beginning, the first buffer 608_1 is selected by the MUX 606, and the context array $CA_1$ at the LCU/TB indexed by "1" (i.e., the initial context array $CA_1$ for the tile $T_{11}$) is initialized by the entropy decoding core 102. When the entropy decoding of the tile $T_{11}$ encounters a tile boundary (e.g., a vertical/column boundary $VB_1$), the first buffer 608_1 maintains the context array $CA_1$ updated at the LCU/TB indexed by "4", the MUX 606 selects the second buffer 608_2, and the context array $CA_2$ at the LCU/TB indexed by "13" (i.e., the initial context array $CA_2$ for the tile $T_{12}$) is inherited from the context array $CA_1$ updated at the LCU/TB indexed by "4". When the entropy decoding of the tile $T_{12}$ encounters a tile boundary (e.g., a vertical/column boundary $VB_2$), the second buffer 608_2 maintains the context array $CA_2$ updated at the LCU/TB indexed by "18", the MUX 606 selects the third buffer 608_3, and the context array $CA_3$ at the LCU/TB indexed by "31" (i.e., the initial context array $CA_3$ for the tile $T_{13}$) is inherited from the context array $CA_2$ updated at the LCU/TB indexed by "18". When the entropy decoding of the tile $T_{13}$ encounters a tile boundary (e.g., a vertical/column boundary $VB_3$), the context array $CA_3$ updated at the LCU/TB indexed by "33" is maintained in the third buffer 608_3, and the MUX 606 selects the first buffer 608_1 again such that the decoding operation of the tile $T_{11}$ is resumed. As a person skilled in the art can readily understand loading and storing of the context arrays required for decoding the following LCUs/TBs by referring to FIG. 11, further description is omitted here for brevity.

In conclusion, a buffering method employed by any of the aforementioned entropy decoders for buffering context arrays of a multi-tile encoded picture having a plurality of tiles may include at least the following steps: buffering a first context array referenced for performing entropy decoding upon a first tile of the multi-tile encoded picture; and buffering a second context array referenced for performing entropy decoding upon a second tile of the multi-tile encoded picture when the first tile is currently decoded according to the buffered first context array.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A buffering apparatus for buffering context arrays of a multi-tile encoded picture having a plurality of tiles, the buffering apparatus comprising:
   a first buffer, arranged to buffer a first context array referenced for performing entropy decoding upon a first tile of the multi-tile encoded picture;
   a second buffer, arranged to buffer a second context array referenced for performing entropy decoding upon a second tile of the multi-tile encoded picture; and
   a multiplexer, coupled to one of the first buffer and the second buffer;
   wherein when the first tile is currently decoded according to the first context array buffered in the first buffer, the second context array is buffered in the second buffer; entropy decoding of the second tile is started before the first tile is fully entropy decoded; and
   when entropy decoding of the first tile encounters a tile boundary, the multiplexer switches between the first buffer and the second buffer.

2. The buffering apparatus of claim 1, wherein when the entropy decoding of the first tile encounters the tile boundary, the first context array is stored into the second buffer, and the second context array is loaded into the first buffer.

3. The buffering apparatus of claim 2, further comprising:
   a buffer access enhancement circuit, coupled between the first buffer and the second buffer, for pre-fetching the second context array from the second buffer or post-storing the first context array into the second buffer.

4. The buffering apparatus of claim 1, wherein when the second tile is currently decoded according to the second context array buffered in the second buffer, the first context array is buffered in the first buffer.

5. The buffering apparatus of claim 1, wherein
   the multiplexer has a plurality of first connection ports and a second connection port;
   wherein the first buffer and the second buffer are coupled to a first specific port and a second specific port included in the first connection ports, respectively.

6. The buffering apparatus of claim 5, wherein when the entropy decoding of the first tile encounters the tile boundary, the multiplexer switches an interconnection between the second connection port and the first specific port to an interconnection between the second connection port and the second specific port.

7. The buffering apparatus of claim 1, wherein the first tile and the second tile are dependent tiles.

8. The buffering apparatus of claim 1, wherein at least one of the first buffer and the second buffer is a register, an internal buffer or an external buffer of an entropy decoder.

9. The buffering apparatus of claim 1, wherein the multi-tile encoded picture has N horizontally adjacent partitions, and a number of buffered context arrays maintained by the buffering apparatus during entropy decoding of the multi-tile encoded picture is equal to N.

10. A buffering method for buffering context arrays of a multi-tile encoded picture having a plurality of tiles, the buffering method comprising:
    buffering a first context array referenced for performing entropy decoding upon a first tile of the multi-tile encoded picture;
    buffering a second context array referenced for performing entropy decoding upon a second tile of the multi-tile encoded picture when the first tile is currently decoded according to the buffered first context array; and
    when entropy decoding of the first tile encounters a tile boundary, performing a multiplexing operation to switch between the buffered first context array and the buffered second context array;
    wherein entropy decoding of the second tile is started before the first tile is fully entropy decoded.

11. The buffering method of claim 10, wherein the first context array is buffered in a first buffer, the second context array is buffered in a second buffer, and the buffering method further comprises:
    when the entropy decoding of the first tile encounters the tile boundary, storing the first context array into the second buffer, and loading the second context array into the first buffer.

12. The buffering method of claim 11, further comprising:
    pre-fetching the second context array from the second buffer; or
    post-storing the first context array into the second buffer.

13. The buffering method of claim 10, wherein the step of buffering the first context array comprises:
    buffering the first context array when the second tile is currently decoded according to the second context array.

14. The buffering method of claim 10, wherein the step of performing the multiplexing operation to switch between the buffered first context array and the buffered second context array comprises:
    outputting the buffered second context array to substitute for the buffered first context array.

15. The buffering method of claim 10, wherein the first tile and the second tile are dependent tiles.

16. The buffering method of claim 10, wherein at least one of the first context array and the second context array is stored in a register, an internal buffer or an external buffer of an entropy decoder.

17. The buffering method of claim 10, wherein the multi-tile encoded picture has N horizontally adjacent partitions, and a number of buffered context arrays maintained during entropy decoding of the multi-tile encoded picture is equal to N.

18. An entropy decoder, comprising:
    an entropy decoding core, arranged to perform entropy decoding upon a multi-tile encoded picture, having a plurality of tiles included therein, in a raster scan order, wherein the entropy decoding core starts decoding a portion of a current tile after decoding a portion of a previous tile; and
    a buffering apparatus, coupled to the entropy decoding core, for buffering context arrays of the multi-tile encoded picture, the buffering apparatus comprising:
    a first buffer, arranged to buffer a first context array referenced for performing entropy decoding upon a first tile of the multi-tile encoded picture;

a second buffer, arranged to buffer a second context array referenced for performing entropy decoding upon a second tile of the multi-tile encoded picture; and a multiplexer, coupled to one of the first buffer and the second buffer;

wherein when the first tile is currently decoded according to the first context array buffered in the first buffer, the second context array is buffered in the second buffer;

entropy decoding of the second tile is started before the first tile is fully entropy decoded; and when entropy decoding of the first tile encounters a tile boundary, the multiplexer switches between the first buffer and the second buffer.

19. The entropy decoder of claim 18, wherein the multi-tile encoded picture has N horizontally adjacent partitions, and a number of buffered context arrays maintained by the buffering apparatus during entropy decoding of the multi-tile encoded picture is equal to N.

\* \* \* \* \*